(12) United States Patent
Yen et al.

(10) Patent No.: US 10,095,060 B2
(45) Date of Patent: Oct. 9, 2018

(54) DISPLAY PANEL AND DISPLAY DEVICE

(71) Applicant: InnoLux Corporation, Miao-Li County (TW)

(72) Inventors: Chun-Sheng Yen, Miao-Li County (TW); Chia-Chieh Fan, Miao-Li County (TW); Ming-Tsang Wu, Miao-Li County (TW); Pai-Chi Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/495,577

(22) Filed: Apr. 24, 2017

(65) Prior Publication Data

US 2017/0322444 A1 Nov. 9, 2017

(30) Foreign Application Priority Data

May 4, 2016 (CN) .......................... 2016 1 0288997

(51) Int. Cl.
*G06F 1/16* (2006.01)
*G02F 1/1333* (2006.01)
*G02F 1/1335* (2006.01)

(52) U.S. Cl.
CPC .. *G02F 1/133308* (2013.01); *G02F 1/133528* (2013.01); *G02F 2001/13332* (2013.01); *G02F 2202/28* (2013.01); *G06F 1/16* (2013.01)

(58) Field of Classification Search
None
See application file for complete search history.

(56) References Cited

U.S. PATENT DOCUMENTS

| 2013/0285516 | A1* | 10/2013 | Mizoguchi | H05K 5/02 312/7.2 |
| 2014/0176850 | A1* | 6/2014 | Kim | F21V 15/04 349/58 |
| 2015/0199038 | A1* | 7/2015 | Li | G06F 3/041 345/173 |
| 2016/0209582 | A1* | 7/2016 | Kawata | G02B 6/0028 |

(Continued)

FOREIGN PATENT DOCUMENTS

| CN | 203338336 U | 12/2013 |
| CN | 104076540 A | 10/2014 |

(Continued)

*Primary Examiner* — Courtney Smith
*Assistant Examiner* — Rashen E Morrison
(74) *Attorney, Agent, or Firm* — Muncy, Geissler, Olds & Lowe, P.C.

(57) ABSTRACT

A display device includes a first substrate, a second substrate, a first polarizer, a second polarizer and a frame. The frame contacts with a first surface and a first side of the first substrate, a second surface and a second side of the second substrate, and a third side of the first polarizer. The frame has a fourth surface and a fourth side connecting to the fourth surface, and the fourth side is disposed corresponding to the second side. In a first direction perpendicular to the first surface, a shortest distance between the fourth and first surfaces is a first distance, a shortest distance between the fourth and first surfaces is a second distance, and a shortest distance between the third and first surfaces is a third distance. The third distance is substantially equal to the first distance, and the first distance and the second distance are different.

20 Claims, 4 Drawing Sheets

(56) References Cited

U.S. PATENT DOCUMENTS

2016/0238875 A1* 8/2016 Peng ................. G02F 1/133308
2016/0327831 A1* 11/2016 Zhang ................ G02F 1/13338
2016/0357059 A1* 12/2016 Xu .................... G02F 1/133528

FOREIGN PATENT DOCUMENTS

TW           432832 B      5/2001
TW         201341894 A    10/2013

* cited by examiner

DISPLAY PANEL AND DISPLAY DEVICE

CROSS REFERENCE TO RELATED APPLICATIONS

This Non-provisional application claims priority under 35 U.S.C. § 119(a) on Patent Application No(s). 201610288997.4 filed in People's Republic of China on May 4, 2016, the entire contents of which are hereby incorporated by reference.

BACKGROUND

Technical Field

The present disclosure relates to a display panel and a display device having flat appearance.

Related Art

Due to the advantages such as low power consumption, less weight, compact size and less radiation, the liquid crystal display (LCD) devices been applied to various electronic products, such as mobile phones, portable multimedia devices, notebook computers, liquid crystal TVs and liquid crystal screens.

For example, as shown in FIG. 1, the display device 1 mainly includes an LCD panel 11 and a backlight module 12. The backlight module 12 is disposed corresponding to the LCD panel 11 and is configured for emitting light to the display panel 11 evenly. In the conventional modulation design, a metal frame 13 is used to cover the upper surface 111 of the display panel 11 and then combine to the backlight module 12. Finally, an outer frame (e.g. a plastic frame, not shown) is provided to cover the assembled metal frame 13 to form the final product. Accordingly, the metal frame 13 and outer frame protrude from the upper surface 111 of the display panel 11, and this design can't achieve the flat requirement for the appearance of the final product.

SUMMARY

An objective of this disclosure is to provide a display panel and a display device with flat appearance, which can achieve the high-taste design requirement.

A display panel of this disclosure includes a first substrate, a second substrate, a first polarizer, a second polarizer and a frame. The first substrate has a first surface and a first side connecting to the first surface. The second substrate is disposed at one side of the first substrate away from the first surface and has a second surface and a second side connecting to the second surface. The second side is disposed corresponding to the first side. The first polarizer disposed on the first surface has a third surface and a third side connecting to the third surface. The third side is disposed corresponding to the first side. The frame is disposed adjacent to the first substrate, the second substrate and the first polarizer and contacts with the first surface, the first side, the second surface, the second side and the third side. The frame has a fourth surface and a fourth side connecting to the fourth surface, and the fourth side is disposed corresponding to the second side. In a first direction perpendicular to the first surface, a shortest distance between the fourth surface and the first surface is defined as a first distance, a shortest distance between the fourth surface and the second surface is defined as a second distance, and a shortest distance between the third surface and the first surface is defined as a third distance. The third distance is substantially equal to the first distance, and the first distance and the second distance are different.

As mentioned above, the display panel and display device of this disclosure have a frame with an upper surface substantially located at the same plane as the upper surface of the first polarizer. Accordingly, in the process for assembling the display panel and the backlight module, the metal frame is not needed for covering the upper surface of the panel. Moreover, it is unnecessary to provide a metal frame for covering the metal frame in the final product. As a result, the display panel and display device of the disclosure as well as the final product have flat appearance, which can achieve the high-taste design requirement.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE INVENTION

The embodiments will be apparent from the following detailed description, which proceeds with reference to the accompanying drawings, wherein the same references relate to the same elements.

Moreover, the drawings of all implementation are schematic, and they do not mean the actual size and proportion. The terms of direction recited in the disclosure, for example up, down, left, right, front, or rear, only define the directions according to the accompanying drawings for the convenience of explanation but not for limitation. The names of elements and the wording recited in the disclosure all have ordinary meanings in the art unless otherwise stated. Therefore, a person skilled in the art can unambiguously understand their meanings.

Figure 1:
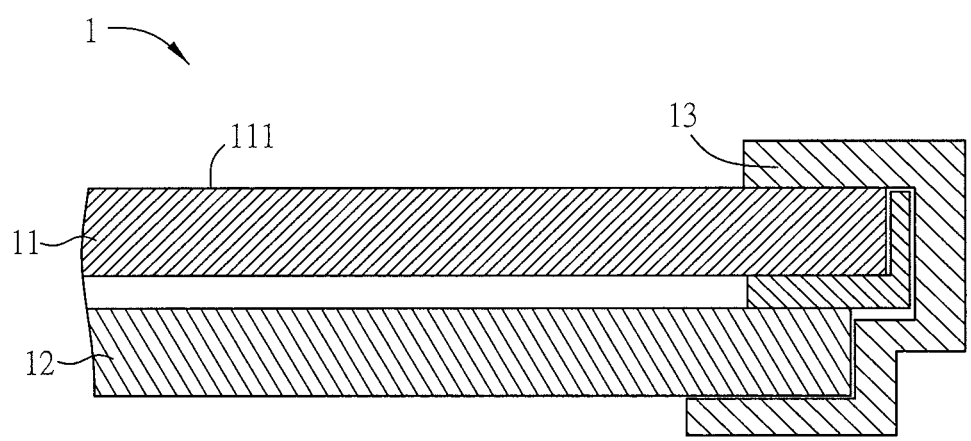
FIG. 1 is a schematic diagram showing the assembled conventional display panel and backlight module.
Figure 2A:
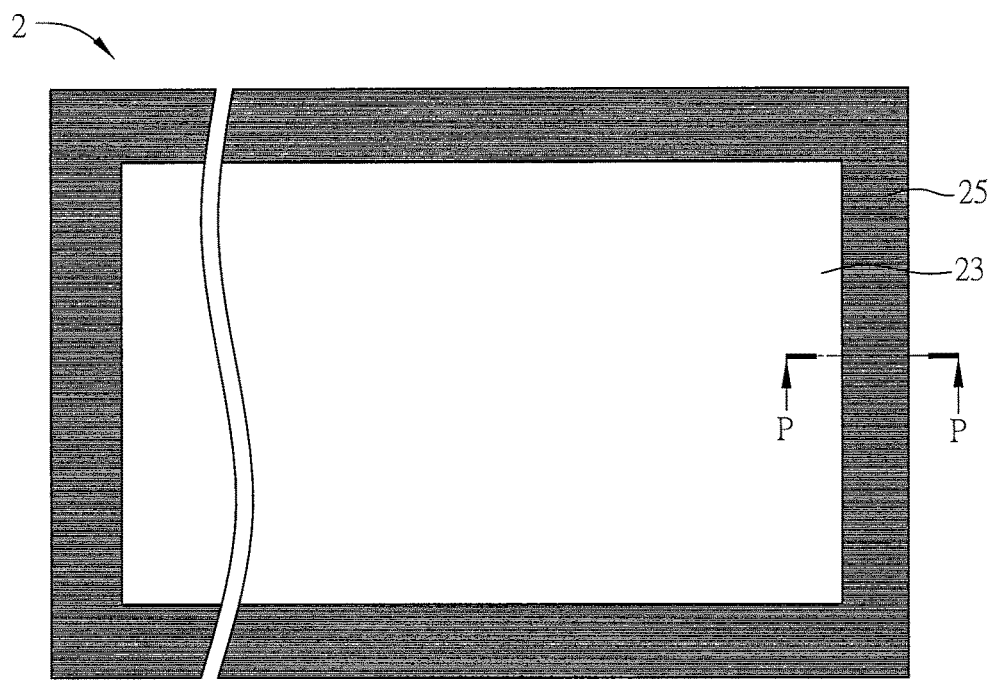
FIG. 2A is a top view of a display panel according to an embodiment of the disclosure.
Figure 2B:
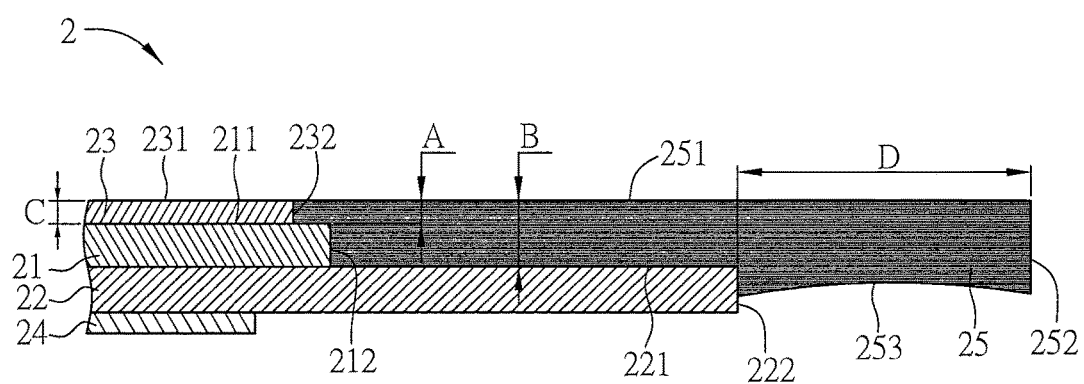
FIG. 2B is a sectional view of the display panel of FIG. 2A along the line P-P.

FIG. 2A is a top view of a display panel 2 according to an embodiment of the disclosure, and FIG. 2B is a sectional view of the display panel 2 of FIG. 2A along the line P-P. As shown in FIGS. 2A and 2B, the display panel 2 of this embodiment is an LCD panel such as an IPS (In-plane switch) LCD panel, an FFS (Fringe Field Switching) LCD panel, a VA mode (Vertical Alignment mode) LCD panel, or a 3D LCD panel, and this disclosure is not limited. In other embodiments, the display panel 2 could be an organic light emitting diode display (OLED display) or an inorganic light emitting diode display with micrometer size (micro LED display).

The display panel 2 includes a first substrate 21, a second substrate 22, a first polarizer 23, a second polarizer 24 and a frame 25.

The first substrate 21 has a first surface 211 and a first side 212 connecting to the first surface 211. In this embodiment, the first surface 211 is an upper surface of the first substrate 21, which is the surface of the first substrate 21 facing the viewer. The first side 212 is one side surface of the first substrate 21 connecting to the first surface 211.

The second substrate 22 is disposed at one side of the first substrate 21 away from the first surface 211, and the first substrate 21 and the second substrate 22 are disposed corresponding to each other. In this embodiment, the first substrate 21 is a CF (color filter) substrate, and the second substrate 22 is a TFT (thin-film-transistor) substrate. Of course, in other embodiments, the black matrix of the CF substrate can be formed on the TFT substrate, and the second substrate 22 becomes a BOA (BM on array) substrate. Alternatively, the filter layer of the CF substrate can be formed on the TFT substrate, so that the second substrate 22 becomes a COA (color filter on array) substrate. In other embodiments, the black matrix and the filter layer of the CF substrate can be formed on the TFT substrate. In other embodiments, the first substrate 21 could be a cover substrate or a protection substrate for the OLED display or the micro LED display, and this disclosure is not limited.

The second substrate 22 has a second surface 221 and a second side 222 connecting to the second surface 221. The second side 222 is disposed corresponding to the first side 212. In this embodiment, the second surface 221 is an upper surface of the second substrate 22, which is the surface of the second substrate 22 facing the viewer. The second side 222 is one side surface of the second substrate 22 connecting to the second surface 221. The first side 212 and the second side 222 are disposed at the same side of the display panel 2.

The first polarizer 23 is disposed on one side of the first surface 21 away from the second substrate 22, and the second polarizer 24 is disposed at one side of the second substrate 22 away from the first substrate 21. In this embodiment, the first polarizer 23 is an upper polarizer, and the second polarizer is a lower polarizer. The first polarizer 23 is attached to the first surface 211 of the first substrate 21, and the second polarizer 24 is attached to the lower surface of the second substrate 22, which is opposite to the second surface 221. The first polarizer 23 has a third surface 231 and a third side 232 connecting to the third surface 231. The third side 232 is disposed corresponding to the first side 212. In this embodiment, the third surface 231 is a surface of the first polarizer 23 facing the viewer. The third side 232 is one side surface of the first polarizer 23 connecting to the third surface 231. The first side 212, the second side 222 and the third side 232 are disposed at the same side of the display panel 2.

The frame 25 is disposed adjacent to the first substrate 21, the second substrate 22 and the first polarizer 23, and contacts with the first surface 211 and the first side 212 of the first substrate 21, the second surface 221 and the second side 222 of the second substrate 22, and the third side 232 of the first polarizer 23. As shown in FIGS. 2A and 2B, the frame 25 is around the first substrate 21, the second substrate 22 and the first polarizer 23, and the frame 25 contacts with at least one side and a part of the upper surface of the first substrate 21, at least one side and a part of the upper surface of the second substrate 22, and at least one side of the first polarizer 23. In some embodiments, the frame 25 is disposed at least of a portion of at some areas instead of being around the first substrate 21, the second substrate 22 and the first polarizer 23.

In addition, the frame 25 contacts at least a portion of the third side 232 of the first polarizer 23, the first side 212 of the first substrate 21, and a part of the second side 222 of the second substrate 22. In this embodiment, the frame 25 contacts at least one side (including the third side 232) of the first polarizer 23, at least one side (including the first side 212) of the first substrate 21, and at least a portion (including the second side 222) of the second substrate 22, but the frame 25 doesn't contact with the four sides of the first polarizer 24. In other embodiments, the frame 25 may contact at least one side of the first polarizer 23, at least one side of the first substrate 21, and at least one side of the second substrate 22, and at least one side of the second polarizer 24. This disclosure is not limited. The frame 25 is around the sides of the first substrate 21 and the second substrate 22, so that the frame 25 can protect the first substrate 21 and the second substrate 22 from being broken.

In addition, the frame 25 has a fourth surface 251 and a fourth side 252 connecting to the fourth surface 251, and the fourth side 252 is disposed corresponding to the second side 222. In this embodiment, the fourth surface 251 is a surface of the frame 25 facing the viewer, and the fourth side 252 is a side surface of the frame 25 connecting to the fourth surface 251. The first side 212, the second side 222, the third side 232 and the fourth side 252 are located at the same side of the display panel 2. The fourth surface 251 of the frame 25 and the first surface 211 of the first substrate 21 have a first shortest distance A, and a distance between the third surface 231 of first polarizer 23 and the first surface 211 of the first substrate 21 is substantially equal to the first shortest distance A. Accordingly, the fourth surface 251 of the frame 25 and the third surface 231 of the first polarizer 23 are substantially located at the same plane. In other words, within the display panel 2, the appearances of the surface of the frame 25 facing the viewer (including the fourth surface 251) and the surface of the first polarizer 23 facing the viewer (including the third surface 231) are in a flat statement. In some embodiments, the distance between the third surface 231 of first polarizer 23 and the first surface 211 of the first substrate 21 may have a little difference with the first distance A, in a first direction perpendicular to the first surface, due to the processing deviation.

Moreover, the fourth surface 251 of the frame 25 and the second surface 221 of the second substrate 22 have a second distance B in a first direction perpendicular to the first surface, and the second side 222 of the second substrate 22 and the fourth side 252 of the frame 25 have a fourth distance D in a second direction horizontal to the first surface. In the display panel 2 of this embodiment, the first shortest distance A ranges from 0.065 mm to 0.192 mm (0.065 mm≤A≤0.192 mm), the second shortest distance B ranges from 0.15 mm to 0.7 mm (0.15 mm≤B≤0.7 mm), and the fourth shortest distance D is ranges from 0.5 mm to 3.0 mm (0.5 mm≤D≤3.0 mm). Besides, the frame 25 further includes a fifth surface 253 opposite to the fourth surface 251, and the fourth side 252 connects to the fourth surface 251 and the fifth surface 253, respectively. The fourth side 252 connects to the fifth surface 253 to form a curved surface.

The frame 25 includes two mixing materials including a first material and a second material. The percentages, process parameters, and material characteristics of the first material and the second material can be varied depending on the selected materials. This disclosure is not limited. The colors of materials of the frame 25 can be, for example, black, white or others. The hardness of the frame 25 is greater than or equal to Shore D 50 and less than and equal to Shore D 90 (50≤Shore D≤90). In some embodiment, an optimal value of the hardness of the frame 25 is greater than and equal to Shore D 70 and less than and equal to Shore D 90 (70≤Shore D≤90). In addition, the frame 25 can be an insulation material. For example, the volume resistivity of the frame 25 is greater than $10^{12}$ ohm·cm (25° C.), or the surface resistivity of the frame 25 is greater than $10^{12}$ ohm (25° C.).

In one embodiment, the first material can be, for example but not limited to, epoxy, and the second material is a hardener. A ratio E of weight of the first material to weight the second material in the mixture ranges from 1:1 to 10:1 ($1:1 \leq E \leq 10:1$). The viscosity F of the first material (epoxy) ranges from 2000 cP to 6000 cP ($2000 \text{ cp} \leq F \leq 6000 \text{ cp}$), and the viscosity G of the second material (hardener) ranges from 150 cP to 250 cP ($150 \text{ cp} \leq G \leq 250 \text{ cp}$). The viscosity H of the mixture of the first material and the second material ranges from 1400 cP to 1600 cP ($1400 \text{ cp} \leq H \leq 1600 \text{ cp}$). In this embodiment, the mixture of the first material and the second material can be solidified to form an insulation material with a volume resistivity of about $10^{16}$ ohm·cm (25° C.) or a surface resistivity of about $10^{15}$ ohm (25° C.). Moreover, the display panel 2 may further include a display intermedia (not shown), such as a liquid crystal layer, disposed between the first substrate 21 and the second substrate 22. In other embodiments, an OLED display or a micro LED display may include diode display units or diode display elements disposed between the first substrate 21 and the second substrate 22.

As mentioned above, the display panel 2 of this embodiment has a frame 25 with an upper surface substantially located at the same plane as the upper surface of the first polarizer 23. Accordingly, in the process for assembling the display panel and the backlight module, the metal frame is not needed for covering the upper surface of the panel so as to assemble the display panel 2 and the backlight module by, for example, adhesion. Moreover, it is unnecessary to provide an outer frame for covering the metal frame in the final product. As a result, the display panel 2 of the embodiment as well as the final product have appearance, which can achieve the high-taste design requirement.

FIGS. 3A to 3D are schematic diagrams showing the manufacturing process of the display panel of the disclosure. The manufacturing process of the display panel 2 will be described hereinafter with reference to FIGS. 3A to 3D.

Figure 3A:
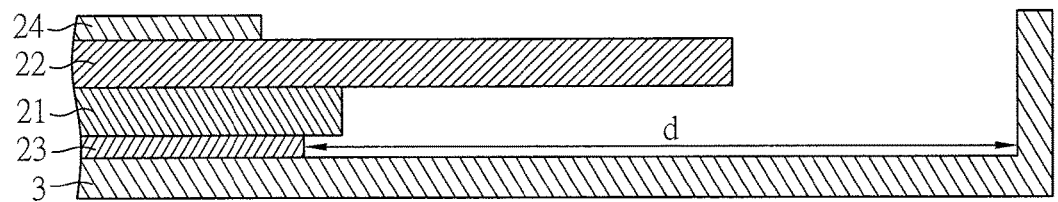
FIGS. 3A to 3D are schematic diagrams showing the manufacturing process of the display panel of the disclosure.

As shown in FIG. 3A, the first step is to reverse the assembly (a panel unit) including the first substrate 21, the second substrate 22, the first polarizer 23 and the second polarizer 24, so that the second polarizer 24 is at the top and the first polarizer 23 is at the bottom in a mold 3. Herein, the mold 3 has low surface energy (LSE), so that the separating procedure can be easily performed with the mold 3. In other words, the mold 3 is made of a material with large water contact angle (or a hydrophobic material). In FIG. 2B, the surface roughness of the fourth surface 251 of the frame 25 is determined by the smoothness or roughness of the inner surfaces of the mold 3.

Next, the second step is to fix the gap between the panel unit and the mold 3. For example, one or more positioning pins are configured to fix the gap between the panel unit and the mold 3. Herein, the size of the fourth surface 251 of the frame 25 in FIG. 2B is determined by the gap between the panel unit and the mold 3. As shown in FIG. 3A, the distance d between the first polarizer 23 and the mold 3 defines the width of the fourth surface 251 of the frame 25. Of course, the width of the fourth surface 251 can be determined by the following processes. For example, the width of the fourth surface 251 is adjusted by polishing.

Then, the third step is around the surface of the panel unit and the mold 3. For example, a weight unit can be provided on the panel unit for pressing the panel unit to achieve between the first polarizer 23 and the mold 3.

Figure 3B:
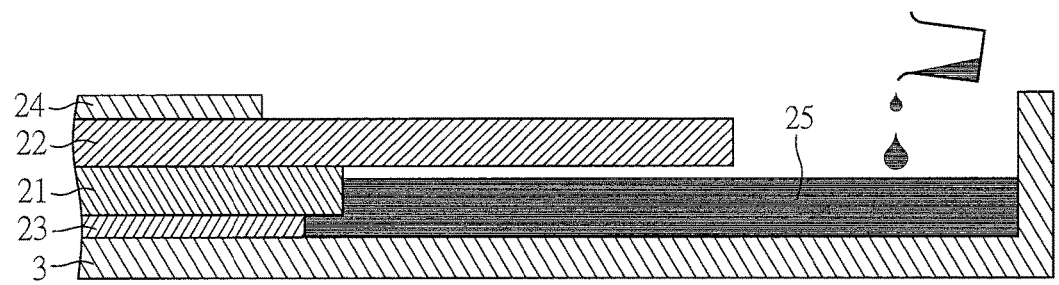
Figure 3C:
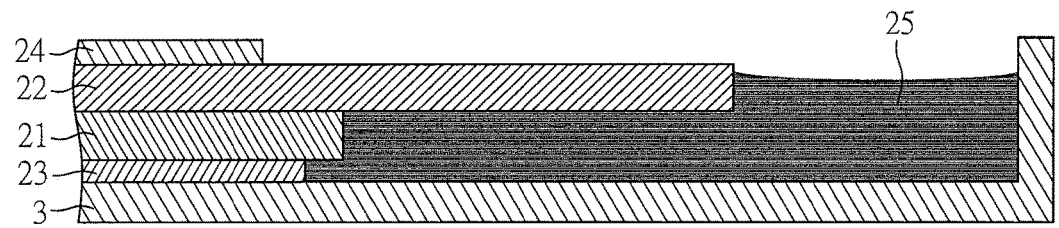

As shown in FIGS. 3B and 3C, the fourth step is to slowly pour the fluid frame 25 into the gap between the panel unit and the mold 3 until the desired thickness. In this embodiment, the frame 25 includes a first material and a second material, which can be referred to the above description.

Afterwards, the fifth step is to solidify the frame 25. In this embodiment, the frame 25 can be placed in room temperature or be heated for solidification. For example, the frame 25 can be placed in room temperature (25° C.) for 10 hours for solidification, or be heated to 60-70° C. for 10 hours for solidification.

Figure 3D:
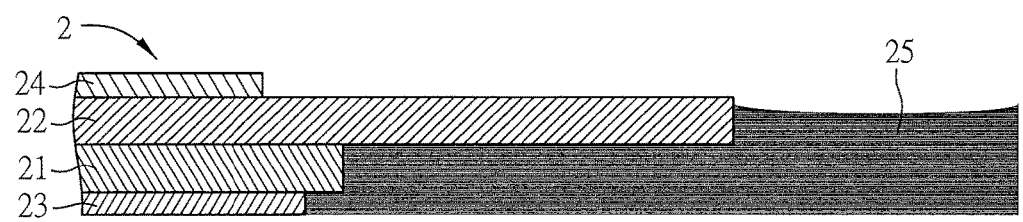

Finally, as shown in FIG. 3D, the sixth step is to remove the mold 3 to obtain the up side down display panel 2.

Figure 4:
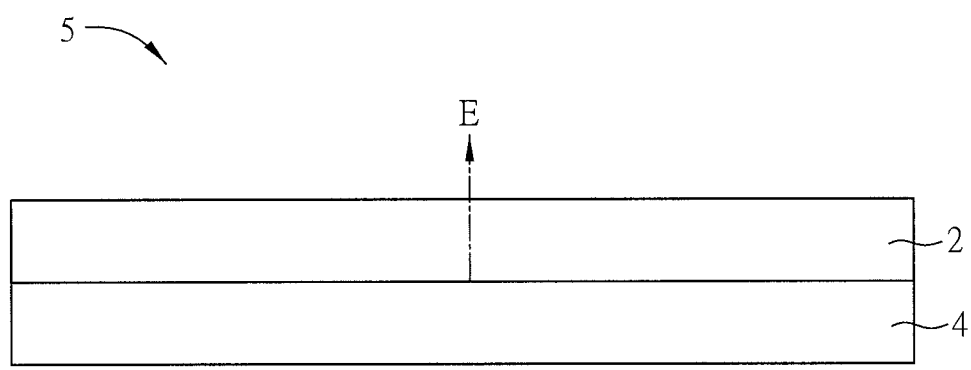
FIG. 4 is a schematic diagram showing a display device according to an embodiment of the disclosure.

FIG. 4 is a schematic diagram showing a display device 5 according to an embodiment of the disclosure.

The display device 5 includes a display panel 2 and a backlight module 4, which are disposed corresponding to each other. In this embodiment, the display panel 2 is a LCD panel. The details of the display panel 2 can be referred to the above embodiment, so the detailed description thereof will be omitted. The backlight module 4 emits light E, and the light E can pass through the pixels of the display panel 2 to show the desired image.

In summary, the display panel and display device of this disclosure have a frame with an upper surface substantially located at the same plane as the upper surface of the first polarizer. Accordingly, in the process for assembling the display panel and the backlight module, the metal frame is not needed for covering the upper surface of the panel. Moreover, it is unnecessary to provide an outer frame for covering the metal frame in the final product. As a result, the display panel and display device of the disclosure as well as the final product have flat appearance, which can achieve the high-taste design requirement.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display panel comprising:
   a first substrate having a first surface and a first side connecting to the first surface;
   a second substrate disposed at one side of the first substrate away from the first surface, and having a second surface and a second side connecting to the second surface, wherein the second side is disposed corresponding to the first side;
   a first polarizer disposed on the first surface, and having a third surface and a third side connecting to the third surface, wherein the third side is disposed corresponding to the first side; and
   a frame disposed adjacent to the first substrate, the second substrate and the first polarizer, and having a fourth surface and a fourth side connecting to the fourth surface, wherein the frame contacts with the first surface, the first side, the second surface, the second side and the third side, and the fourth side is disposed corresponding to the second side;
   wherein, the fourth surface of the frame and the third surface of the first polarizer are substantially located at the same plane and at a viewer-side of the display panel,
   wherein, in a first direction perpendicular to the first surface, a shortest distance between the fourth surface and the first surface is defined as a first distance, a shortest distance between the fourth surface and the second surface is defined as a second distance, and a shortest distance between the third surface and the first surface is defined as a third distance, wherein the third distance is substantially equal to the first distance, and the first distance and the second distance are different.

2. The display panel of claim 1, wherein the first side, the second side, the third side and the fourth side are located at one side of the display panel.

3. The display panel of claim 1, wherein the frame is around the first substrate, the second substrate and the first polarizer.

4. The display panel of claim 1, wherein the frame comprises a first material and a second material, a viscosity of a mixture of the first material and the second material ranges from 1400 cP to 1600 cP.

5. The display panel of claim 1, wherein the frame comprises a first material and a second material, a ratio of weight of the first material to weight the second material in the mixture ranges from 1:1 to 10:1.

6. The display panel of claim 1, wherein a hardness of the frame ranges from Shore D 50 to Shore D 90.

7. The display panel of claim 1, wherein the first distance ranges from 0.065 mm to 0.192 mm.

8. The display panel of claim 1, wherein the second distance ranges from 0.15 mm to 0.7 mm.

9. The display panel of claim 1, wherein, in a second direction perpendicular to the first side, a shortest distance between the fourth side and the second side is defined as a fourth distance, and the fourth distance ranges from 0.5 mm to 3.0 mm.

10. The display panel of claim 1, wherein the frame further has a fifth surface opposite to the fourth surface, the fifth surface connects to the fourth side, and at least a portion of the fifth surface is curved.

11. A display device comprising:
a display panel comprising:
a first substrate having a first surface and a first side connecting to the first surface;
a second substrate disposed at one side of the first substrate away from the first surface and having a second surface and a second side connecting to the second surface, wherein the second side is disposed corresponding to the first side;
a first polarizer disposed on the first surface and having a third surface and a third side connecting to the third surface, wherein the third side is disposed corresponding to the first side; and
an frame disposed adjacent to the first substrate, the second substrate and the first polarizer and contacting with the first surface, the first side, the second surface, the second side and the third side, wherein the frame has a fourth surface and a fourth side connecting to the fourth surface, and the fourth side is disposed corresponding to the second side;

wherein, the fourth surface of the frame and the third surface of the first polarizer are substantially located at the same plane and at a viewer-side of the display panel, wherein, in a first direction perpendicular to the first surface, a shortest distance between the fourth surface and the first surface is defined as a first distance, a shortest distance between the fourth surface and the second surface is defined as a second distance, and a shortest distance between the third surface and the first surface is defined as a third distance, wherein the third distance is substantially equal to the first distance, and the first distance and the second distance are different.

12. The display panel of claim 11, wherein the first side, the second side, the third side and the fourth side are located at one side of the display panel.

13. The display panel of claim 11, wherein the frame is around the first substrate, the second substrate and the first polarizer.

14. The display panel of claim 11, wherein the frame comprises a first material and a second material, a viscosity of a mixture of the first material and the second material ranges from 1400 cP to 1600 cP.

15. The display panel of claim 11, wherein the frame comprises a first material and a second material, a ratio of weight of the first material to weight the second material in the mixture ranges from 1:1 to 10:1.

16. The display panel of claim 11, wherein a hardness of the frame ranges from Shore D 50 to Shore D 90.

17. The display panel of claim 11, wherein the first distance ranges from 0.065 mm to 0.192 mm.

18. The display panel of claim 11, wherein the second distance ranges from 0.15 mm to 0.7 mm.

19. The display panel of claim 11, wherein, in a second direction perpendicular to the first side, a shortest distance between the fourth side and the second side is defined as a fourth distance, and the fourth distance ranges from 0.5 mm to 3.0 mm.

20. The display panel of claim 11, wherein the frame further has a fifth surface opposite to the fourth surface, the fifth surface connects to the fourth side, and at least a portion of the fifth surface is curved.

* * * * *